US006179666B1

United States Patent
Osborn

(10) Patent No.: US 6,179,666 B1
(45) Date of Patent: Jan. 30, 2001

(54) TWO-WAY RADIO ACCESSORY QUICK CONNECT AND EXTENSION CORD

(76) Inventor: Michael L. Osborn, 36075 County Rd., #13, Elizabeth, CO (US) 80107

( * ) Notice: Under 35 U.S.C. 154(b), the term of this patent shall be extended for 0 days.

(21) Appl. No.: 09/246,785

(22) Filed: Feb. 5, 1999

(51) Int. Cl.[7] ................................................. H01R 24/04
(52) U.S. Cl. .......................................................... 439/669
(58) Field of Search .................................... 439/502, 669; 455/100; 174/135

(56) References Cited

U.S. PATENT DOCUMENTS

| | | | |
|---|---|---|---|
| 1,329,029 | * | 1/1920 | Timmons .............................. 379/420 |
| 3,190,974 | * | 6/1965 | Vasicek ................................ 381/375 |
| 3,370,236 | * | 2/1968 | Walker ................................. 455/575 |
| 3,586,977 | * | 6/1971 | Lustig et al. ......................... 455/351 |
| 3,720,874 | * | 3/1973 | Gorcik et al. ........................ 455/575 |
| 4,018,983 | * | 4/1977 | Pedlow ................................ 174/135 |
| 4,885,796 | * | 12/1989 | Loftus et al. ......................... 455/11 |
| 5,038,400 | * | 8/1991 | Baracat et al. ........................ 455/90 |
| 5,118,309 | * | 6/1992 | Ford .................................... 439/620 |
| 5,404,577 | * | 4/1995 | Zuckerman et al. .................. 455/66 |
| 5,465,421 | * | 11/1995 | McCormick et al. ............... 455/344 |
| 6,026,282 | * | 2/2000 | Garcia et al. .......................... 455/90 |

* cited by examiner

Primary Examiner—Steven L. Stephan
Assistant Examiner—Hae Moon Hyeon
(74) Attorney, Agent, or Firm—Edwin H. Crabtree; Ramon L. Pizarro; Donald W. Mangolis

(57) ABSTRACT

A two-way radio accessory quick connect and extension cord for attaching to a speaker/microphone in a face mask of a fire fighter or a hand held speaker/microphone held by the fire fighter. The accessory quick connect allows for rapid connection of one end of the extension cord to the top of the accessory quick connect. The accessory quick connect also provides for allowing any water to drain off the top of the two-way radio to prevent electrical shorting out of the radio. The accessory quick connect includes an adapter housing having electrical pin connectors with a circuit board therein for connecting the electronics of the adapter housing to the electronics of the two-way radio. Extending upwardly from the adapter housing is an adapter male plug. The male plug is connected to the circuit board electronics in the adapter housing. The adapter male plug is dimensioned for receipt inside a first female plug attached to one end of the extension cord. The extension cord includes a fire retardant cover. A second female plug is attached to an opposite end of the extension cord. The second female plug is adapted for releasably engaging a face mask male plug extending outwardly from the fire fighter's face mask. The face mask male plug is attached to the speaker/microphone in the face mask.

12 Claims, 1 Drawing Sheet

TWO-WAY RADIO ACCESSORY QUICK CONNECT AND EXTENSION CORD

BACKGROUND OF THE INVENTION (a) Field of the Invention

This invention relates to two-way radio accessories and more particularly, but not by way of limitation, to a two-way radio accessory quick connect and extension cord for attaching to a speaker/microphone in a face mask of a fire fighter or a hand held speaker/microphone held by the fire fighter. The invention may also be used by policemen and other service providers using two-way radios.

(b) Discussion of Prior Art

Heretofore, fire fighters using two-way radios have had an ongoing problem wherein a remote speaker/microphone included an extension cord that was permanently attached to the radio. Therefore, there was no way to release the extension cord from the radio so that the radio could be passed on to another fire fighter during a 24 hour shift change. Also, some prior art radios included a female connection in the top of the radio which collected water when fighting a fire and the radio shorted out. Further, the female connection in the radio was difficult to find and connect to a male plug at one end of an extension cord when the fire fighter was rushing to the scene of a fire.

In U.S. Pat. No. 5,118,309 to Ford, a wire interface system for a simplex radio is disclosed. The wire interface system includes a disconnect plug for hooking up an earpiece and other accessories to the simplex radio. In U.S. Pat. No. 5,465,421 to McCormick et al., a sports helmet with retrofit kit is described. The retrofit kit includes speakers in the helmet with wiring and a disconnect plug to an audio device. In U.S. Pat. No. 1,329,029 to Timmons, early telephone apparatus is disclosed for attaching to a head band. The apparatus includes a circuit coupling device for connecting to a telephone line.

In U.S. Pat. Nos. 3,190,974 to Vasicek and 3,586,977 to Lustig, two different types of head mounted communication systems are described. In U.S. Pat. Nos. 5,404,577 to Zuckerman and 4,885,796 to Loftus et al., fire fighter type helmets with communication systems are disclosed.

None of the above mentioned prior art prior art patents illustrate or described the unique features, structure and advantages of the subject fire fighter two-way radio accessory quick connect and extension cord for a speaker/microphone.

SUMMARY OF THE INVENTION

In view of the foregoing, it is a primary object of the subject invention to provide a two-way radio accessory quick connect having an adapter housing with male plug that can be quickly connected and disconnected to an extension cord attached to a speaker/microphone in a face mask of a fire fighter or a hand held speaker/microphone. The new quick connect provides a fire fighter with means for easily feeling by hand the upwardly extending male plug and quickly inserting a female plug at one end of the extension cord when rushing to the scene of a fire.

Another object of the invention is the male plug, which extends above the adapter housing attached to the two-way radio, provides for allowing any water to drain off the top of the two-way radio quick when fighting a fire to prevent electrical shorting out of the radio.

Still another object of the accessory quick connect is the adapter housing includes electrical pin connectors with a circuit board therein for connecting to the electronics of various models of two-way radios.

Yet another object of the fire fighters radio accessory quick connect is the use of an extension cord which includes a fire retardant cover for protecting the extension cord when fighting a fire.

A further object of the invention is the extension cord includes a first female plug and a second female plug. The second female plug may be used for releasably engaging a face mask male plug extending outwardly from the fire fighter's face mask. The face mask male plug is attached to the speaker/microphone in the face mask. Also, the second female plug may be used for releasably engaging a male plug attached to a hand-held speaker/microphone.

The subject fire fighters accessory quick connect includes an adapter housing having electrical pin connectors with a circuit board therein for connecting the electronics of the adapter housing to the electronics of the two-way radio. Extending upwardly from the adapter housing is an adapter male plug. The male plug is connected to the circuit board electronics in the adapter housing. The adapter male plug is dimensioned for receipt inside a first female plug attached to one end of the extension cord. The extension cord includes a fire retardant cover for protecting the extension cord when fighting a fire. A second female plug is attached to an opposite end of the extension cord. The second female plug is adapted for engaging a face mask male plug extending outwardly from the fire fighter's face mask. The face mask male plug is attached to the speaker/microphone in the face mask. Also the second female plug is adapted for engaging a male plug attached to the held-held speaker/microphone.

These and other objects of the present invention will become apparent to those familiar with two-way radio accessories and communication equipment used by fire fighters from the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
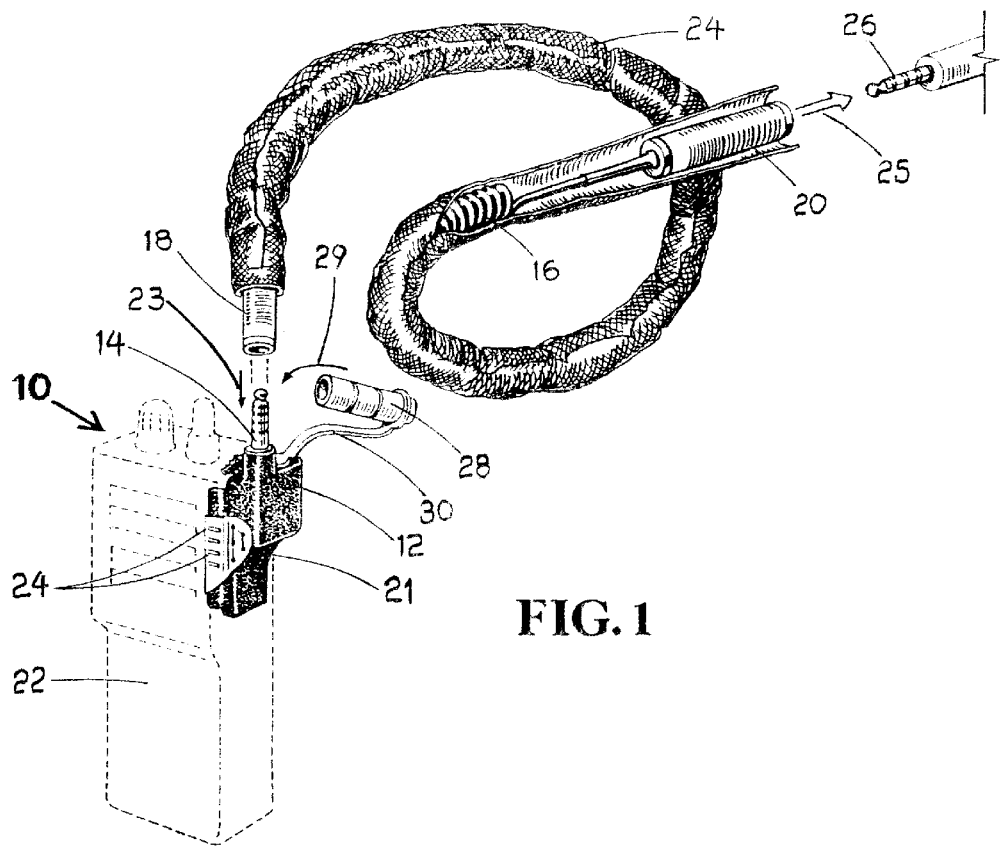
FIG. 1 is a perspective view of the subject fire fighters two-way radio accessory quick connect. The accessory quick connect is shown with an adapter housing and adapter male plug for releasably engaging a first female plug attached to one end of a coiled extension cord. A two-way radio is shown in dashed lines.

In FIG. 1, a perspective view of the subject fire fighters two-way radio accessory quick connect is shown and designated by general reference numeral 10. The accessory quick connect 10 broadly includes an adapter housing 12 with an adapter male plug 14 extending upwardly from the top of the adapter housing 12 and a coiled electrical extension cord 16 with a first female plug 18 and a second female plug 20. In this drawing, the adapter housing 12 is shown attached to the side of a two-way radio 22. The radio 22 is shown in dashed lines.

While the fire fighters accessory quick 10 is discussed herein for use with fire fighters communication equipment, it can be appreciated that the invention may also be used equally well by policemen and others requiring a means for rapidly connecting and disconnecting a remote speaker/mircrophone connected to a two-way radio.

The adapter housing 12 is shown in FIG. 1 with a portion of the housing 12 cut-away to expose electrical pin connectors 24 connected to a printed circuit board 21. The circuit board 21 is electrically connected to the adapter male plug 14. The pin connectors 24 are used for connecting the electronics of the adapter housing 12 to the electronics of the two-way radio 22.

The adapter male plug 14 is dimensioned for releasably receipt inside the first female plug 18 attached to one end of the extension cord 16. The quick connect of the female plug 18 with the male plug 14 is indicated by arrow 23. As mentioned above, the new quick connect 10 provides a fire fighter with means for easily feeling by hand the upwardly extending male plug 14 and quickly inserting the female plug 18 around the male plug 14 when rushing to the scene of a fire. The feeling by hand of the male plug 14 in the adapter housing 12 is important, since a fire fighter wears heavy fire fighter's gloves and the finding of an upwardly extending male plug 14 is far easier than trying to located a female plug in top of prior art two-way radios which in the past has proven to be difficult during a crisis situation.

The extension cord 16 includes a fire retardant cover 24 for protecting the extension cord 16 from excessive heat when fighting a fire. A portion of the cover 24 has been cut-away to expose a portion of the coiled extension cord 16 and the second female plug 20. The cover 24 can be attached to the second female plug 20 with the opposite end of the cover 24 next to the first female plug 18 hanging loose to allow the cord 16 to be free for movement and to expand and contract when in use. Also the cover 24 can be stretchable or have an accordion type structure that will allow the cover to expand and contract with the coiled extension cord 16 while protecting the surface of the cord 16 from heat damage. The second female plug 20 is attached to an opposite end of the extension cord 16. The second female plug 20 is adapted for releasably engaging, as indicated by arrow 25, a remote male plug 26. A portion of the remote male plug 26 is shown in FIG. 1. The adapter housing 12 also includes a male plug cap 28 attached to one end of a tether 30. The opposite end of the tether 30 is attached to the housing 12. The male plug cap 28 is received over the adapter male plug 14 as indicated by arrow 29 when the radio 22 and the adapter housing 12 are not in use. The male plug cap 28 obviously is used to protect the male plug 14 from damage.

Figure 2:
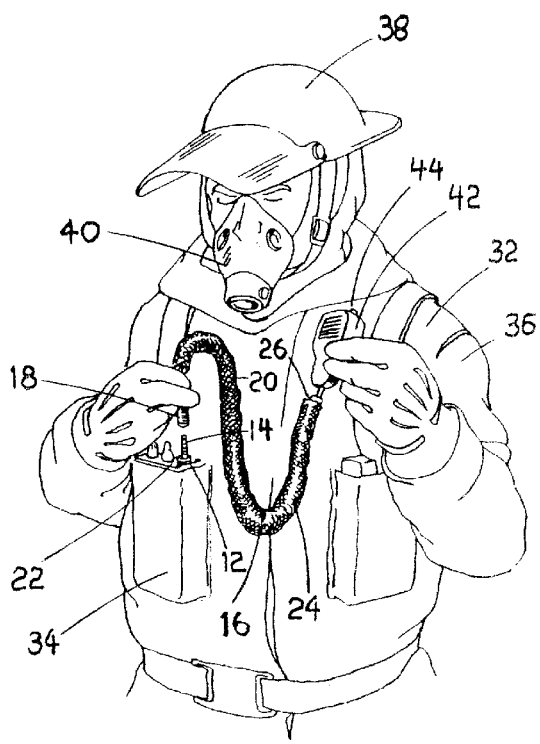
FIG. 2 is a perspective view of the two-radio accessory quick connect with the first female plug held by a fire fighter and positioned for a quick connect to the adapter male plug extending upwardly from the adapter housing attached to a side of the two-way radio received in a pocket in the fire fighter's jacket. The extension cord is shown attached to a held-held speaker/microphone.

In FIG. 2, a perspective view of the two-radio accessory quick connect 10 is shown with the first female plug 18 held by one hand of a fire fighter 32. The first female plug 18 is positioned for a quick connect above the adapter male plug 14. The male plug 14 extending upwardly from the adapter housing 12 attached to a side of the two-way radio 22. The radio 22 is shown received in a pocket 34 in a fire fighter's jacket 36. The fire fighter 32 is shown with a fire fighter's hat 38 and mask 40.

In this drawing, the extension cord 16 is shown attached to a held-held speaker/microphone 42. The second female plug 20, in this example, has been connected to a remote male plug 26 attached to the held-held speaker/microphone 42. The speaker/microphone 42 includes a push-to-talk switch 44 along with a swivel clip for securing the speaker/microphone 42 to a portion of the fire fighter's jacket 36. The swivel clip is not shown in the drawings. The remote speaker/microphone 42 is very important since it provides a means for receiving instructions and passing on information when fighting a fire.

Figure 3:
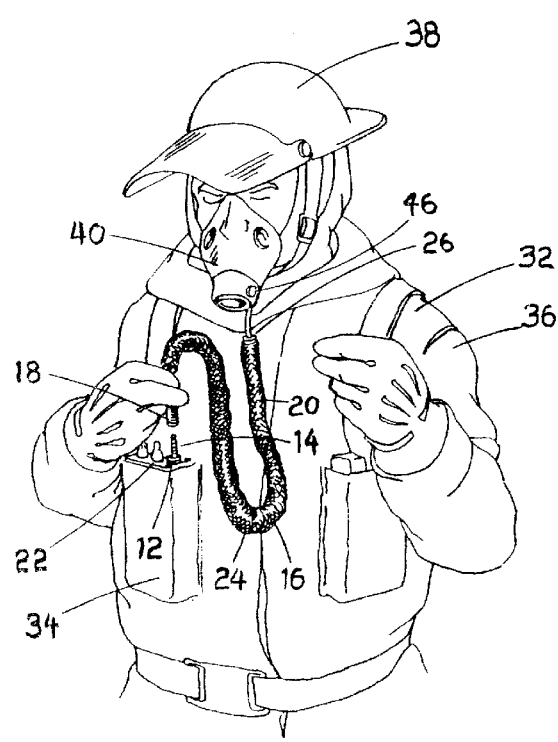
FIG. 3 is another perspective view of the two-radio accessory quick connect with the first female plug held by a fire fighter and positioned for a quick connect to the adapter male plug extending upwardly from the adapter housing attached to a side of the two-way radio received in a pocket in the fire fighter's jacket. In this drawing, the extension cord is shown attached to a face mask male plug extending outwardly from the fire fighter's face mask. The face mask male plug is attached to a speaker/microphone in the face mask.

In FIG. 3, another perspective view of the two-radio accessory quick connect 10 is shown with the first female plug 18 held by the fire fighter 32 and positioned for a quick connect to the adapter male plug 14 extending upwardly from the adapter housing 12. In this drawing, the extension cord 16 is shown attached to the remote male plug 26 which extends outwardly from the fire fighter's face mask 40. In this example, remote male plug 26 is attached to a speaker/microphone in the face mask 40. The face mask 40 is shown with a push-to-talk switch 46 which is hand operated and used when transmitting a message from the fire fighter 32.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A fire fighter two-way radio accessory quick connect for attaching to a two-way radio and to a remote speaker/microphone, the accessory quick connect comprising:

an adapter housing adapted for attachment on the two-way radio and electrically connected to the electronics of the two-way radio;

an adapter male plug electrically connected to said adapter housing, said adapter male plug attached to and extending upwardly from a top of said adapter housing; and an electrical extension cord having a first female plug attached to one end of said extension cord, said first female plug adapted for releasable receipt around said adapter male plug.

2. The accessory quick connect as described in claim 1 wherein said extension cord includes a fire retardant cover therearound and adapted for protecting said extension cord from the heat of a fire.

3. The accessory quick connect as described in claim 1 wherein said adapter housing includes electrical pin connectors with a circuit board and adapted for connecting electronics of said adapter housing to the electronics of the two-way radio.

4. The accessory quick connect as described in claim 3 wherein said male adapter plug is electrically connected to said circuit board in said adapter housing.

5. A fire fighter two-way radio accessory quick connect adapted for attaching to a two-way radio and to a remote male plug attached to a speaker/microphone in a face mask of a fire fighter and attached to a remote male plug attached to a hand held speaker/microphone held by a fire fighter, the accessory quick connect comprising:

an adapter housing adapted for attachment on the two-way radio and electrically connected to the electronics of the two-way radio;

an adapter male plug electrically connected to said adapter housing, said adapter male plug attached to and extending upwardly from a top of said adapter housing; and an electrical extension cord having a first female plug attached to one end of said extension cord and a second female plug attached to an opposite end of said extension cord, said first female plug adapted for releasable receipt around said adapter male plug, said second female plug adapted for releasable receipt around the remote male plug attached to the speaker/microphone.

6. The accessory quick connect as described in claim 5 wherein said extension cord includes a fire retardant cover therearound and adapted for protecting said extension cord from the heat of a fire.

7. The accessory quick connect as described in claim 6 wherein a portion of said fire retardant cover is attached to said second female plug, said extension cord being coiled and expandable inside said fire retardant cover.

8. The accessory quick connect as described in claim 7 wherein said fire retardant cover is expandable for expanding and contracting with said coiled extension cord received therein.

9. The accessory quick connect as described in claim 5 wherein said adapter housing includes electrical pin connectors with a circuit board, said pin connectors adapted for connecting electronics of said adapter housing to the electronics of the two-way radio.

10. A fire fighter two-way radio accessory quick connect adapted for attaching to a two-way radio and to a remote male plug attached to a speaker/microphone in a face mask of a fire fighter and attached to a remote male plug attached to a hand held speaker/microphone held by a fire fighter, the accessory quick connect comprising:

an adapter housing adapted for attachment on the two-way radio and electrically connected to the electronics of the two-way radio, said adapter housing includes electrical pin connectors with a circuit board, said pin connectors adapted for connecting electronics of said adapter housing to the electronics of the two-way radio;

an adapter male plug electrically connected to said adapter housing, said adapter male plug attached to and extending upwardly from a top of said adapter housing, said male adapter plug electrical connected to said circuit board in said adapter housing; and an electrical coiled extension cord having a first female plug attached to one end of said extension cord and a second female plug attached to an opposite end of said extension cord, said first female plug adapted for releasable receipt around said adapter male plug, said second female plug adapted for receipt around the remote male plug attached to the speaker/microphone.

11. The accessory quick connect as described in claim 10 wherein said coiled extension cord includes a fire retardant cover therearound and adapted for protecting said extension cord from the heat of a fire.

12. The accessory quick connect as described in claim 11 wherein said fire retardant cover is expandable for expanding and contracting with said coiled extension cord received therein.

\* \* \* \* \*